No. 785,514. PATENTED MAR. 21, 1905.
W. H. MITCHELL.
PLANTER ATTACHMENT FOR CULTIVATORS.
APPLICATION FILED JUNE 27, 1904.

2 SHEETS—SHEET 1.

Witnesses
C. Munter
L. Hilton

Inventor
Wade H. Mitchell
by H. B. Wilson
Attorney

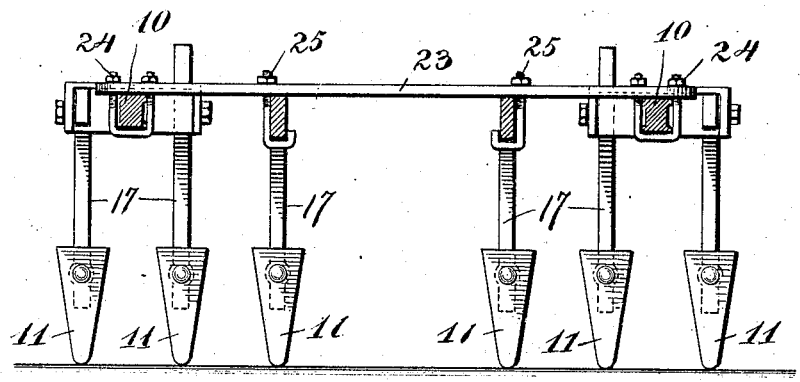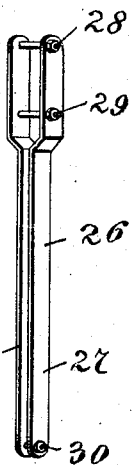

No. 785,514.  
Patented March 21, 1905.

UNITED STATES PATENT OFFICE.

WADE H. MITCHELL, OF RUGBY, TEXAS.

PLANTER ATTACHMENT FOR CULTIVATORS.

SPECIFICATION forming part of Letters Patent No. 785,514, dated March 21, 1905.

Application filed June 27, 1904. Serial No. 214,405.

*To all whom it may concern:*

Be it known that I, WADE H. MITCHELL, a citizen of the United States, residing at Rugby, in the county of Red River and State of Texas, have invented certain new and useful Improvements in Planter Attachments for Cultivators; and I do declare the following to be a full, clear, and exact description of the invention, such as will enable others skilled in the art to which it appertains to make and use the same.

My invention relates to improvements in planter attachments for cultivators.

The object of my invention is to provide simple and inexpensive means for securing a walking-planter to a riding-cultivator, whereby an easily-operating and very efficient planter is produced.

With this and other objects in view the invention consists in certain novel features of construction, combination, and arrangement of parts, as will be hereinafter more fully described, and particularly pointed out in the appended claims.

Figure 1:
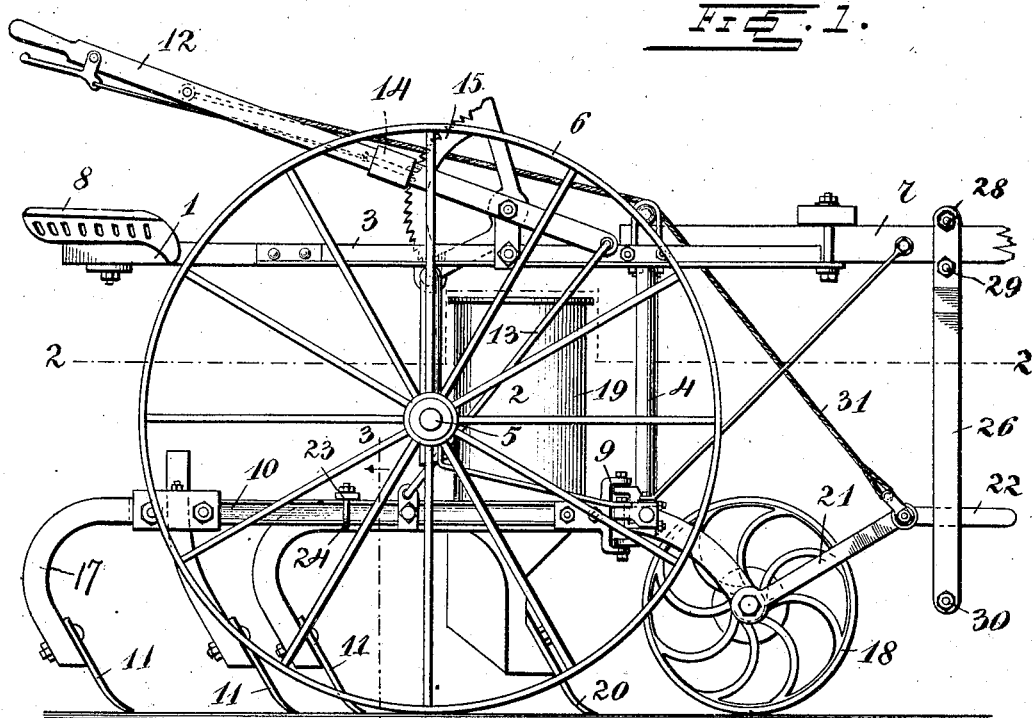
Figure 2:
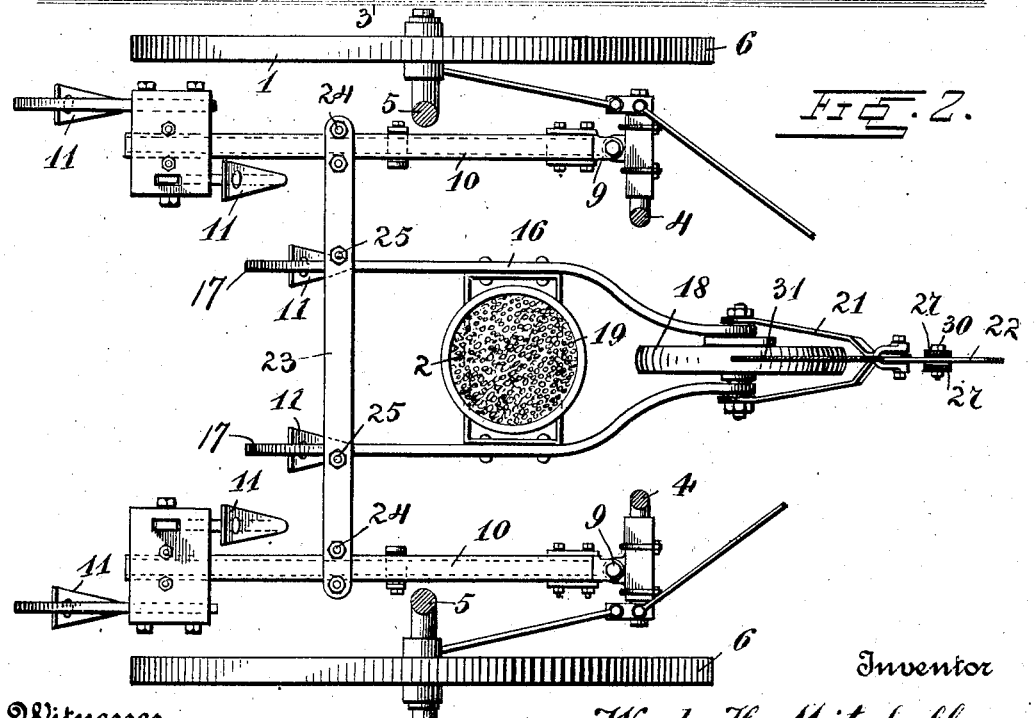

In the accompanying drawings, Figure 1 is a side elevation of a riding-cultivator and a walking-planter secured together in accordance with my invention. Fig. 2 is a horizontal sectional view taken on the plane indicated by the line 2 2 of Fig. 1. Fig. 3 is a vertical transverse sectional view taken on the line 3 3 of Fig. 1, and Fig. 4 is a perspective view of the guide-arm.

Referring to the drawings by numerals, 1 denotes a riding-cultivator of well-known construction, and 2 a well-known form of walking-planter which is secured beneath and within said cultivator-frame by my improved fastening means. As shown, the cultivator comprises a metal frame 3, to the front end of which is secured an arch 4 and to its rear end an arched axle 5, upon the outer ends of which are journaled supporting-wheels 6. The usual tongue or draft-pole 7 is secured to the front end of the frame 3, and upon the rear end of the latter is supported a seat 8. Upon the lower ends of the arch 4 are secured by universal couplings 9 the forward ends of longitudinal beams 10, upon the rear ends of which are mounted the usual cultivator-shovels 11. Said beams 10 are permitted to swing freely upon their couplings 9 and are adapted to be raised and lowered by means of levers 12, which are pivoted intermediate their ends upon the frame 3. The lower ends of said levers are connected by links 13 to the beams 10, and upon their upper ends are spring-actuated pawls 14, which coact with segmental rack-bars 15, secured upon the frame 3. Upon the upper ends of the levers 12 are the usual pivoted hand-pieces, by means of which said pawls are disengaged form the rack to permit said levers to be shifted to raise or lower the shovel-beams 10.

As shown, the planter comprises a frame 16, which is supported at its rear end by shovel-beams 17 and at its front end by a steering and drive wheel 18. Upon the upper side of said frame 16 is mounted the usual seed-hopper 19, and upon the under side of the said frame is the usual furrow-opening shoe 20. Any suitable seed-dropping mechanism may be provided, and it is preferably driven by the wheel 18. Upon the forward end of the frame 16 is a yoke 21, which terminates in a forwardly-projecting tongue 22.

In carrying out my invention I place the planter-frame 16 beneath the frame 3 and arches 4 and 5 of the cultivator and rigidly connect the beams 10 and 17 of the cultivator-frame and planter-frame by a metallic cross-bar 23. Said cross-bar is preferably in the form of a straight metal rod or bar, as shown, but it may be of irregular shape when the planter-beams 17 are not of the same height as the beams 10 of the cultivator. Said beams 10 are secured to the ends of the cross-bar 23, preferably by U-shaped bolts 24, as clearly shown in Fig. 3, and the beams 17 of the planter are secured to the cross-bar 23 intermediate its ends by L-shaped bolts 25. By means of this cross-bar it will be seen that the rear portion of the planter is rigidly secured to the cultivator-beams 10, so that when the latter are raised or lowered the rear portion of the planter will also be raised or lowered.

In order to guide the front end of the planter and keep the latter in alinement with the cultivator, I provide a depending guide-arm 26 upon the draft-tongue 7 of the cultivator. Said arm comprises two spaced metal bars 27, which have their upper ends clamped tightly upon each side of the tongue 7 by bolts 28 29, disposed above and below said tongue. The lower ends of said bars 27 are spaced apart by a bolt 30. The guide-bar 22 is adapted to project between the said spaced bars 27 and to move freely therein in a vertical plane, so that the wheel 18 and the front portion of the planter may raise and lower in passing over uneven ground. In order to permit the wheel 18 in the front portion of the planter to be elevated when it is desired to turn the machine around, I secure upon the rear portion of the steering-tongue 22 one end of a cord, chain, or other flexible connection 31 and pass the latter upwardly and rearwardly through the frame 3, as shown in Fig. 1. The upper end of the said connection 31 is secured upon the upper portion of one of the levers 12, so that when the latter is shifted to raise or lower the rear portion of the planter and cultivator the wheel 18 and front portion of the planter will also be elevated.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. In a combined cultivator and planter, the combination of a guide-arm depending from the draft-tongue of the cultivator, said guide-arm consisting of spaced bars, a planter-frame supported upon the cultivator-frame and provided with a guide-bar projecting between the spaced bars of the guide-arm, said guide-bar being free to move vertically between said spaced bars but held in alinement therewith, and means for raising the planter-frame, substantially as described.

2. In a combined riding cultivator and planter, the combination of a pair of spaced bars depending from the draft-tongue of the cultivator-frame, a planter-frame mounted upon the cultivator-frame, a guide-wheel in front of the planter, a yoke extending forward from the axle of said wheel, a guide-bar secured to said yoke and extending between the spaced bars to form a guide to hold the planter-frame in alinement with the cultivator-frame, and to permit a free vertical movement of the planter-frame, with respect to the cultivator-frame, substantially as described.

In testimony whereof I have hereunto set my hand in presence of two subscribing witnesses.

WADE H. MITCHELL.

Witnesses:
J. D. WILLIAMS,
B. F. McALISTER.